US010614959B2

(12) United States Patent
Kwon et al.

(10) Patent No.: US 10,614,959 B2
(45) Date of Patent: *Apr. 7, 2020

(54) MULTILAYER CERAMIC CAPACITOR (71) Applicant: SAMSUNG ELECTRO-MECHANICS CO., LTD., Suwon-si, Gyeonggi-do (KR)

(72) Inventors: Hyung Soon Kwon, Suwon-si (KR); Kyoung Jin Cha, Suwon-si (KR); Ji Hong Jo, Suwon-si (KR)

(73) Assignee: Samsung Electro-Mechanics Co., LTD., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,062

(22) Filed: Nov. 21, 2018

(65) Prior Publication Data

US 2020/0035416 A1    Jan. 30, 2020

Related U.S. Application Data (63) Continuation of application No. 16/156,694, filed on Oct. 10, 2018.

(30) Foreign Application Priority Data

Jul. 26, 2018 (KR) .................. 10-2018-0087283

(51) Int. Cl.
H01G 4/224 (2006.01)
H01G 4/12 (2006.01)
(Continued)

(52) U.S. Cl.
CPC .......... H01G 4/224 (2013.01); H01G 4/1227 (2013.01); H01G 4/30 (2013.01); H01G 4/232 (2013.01)

(58) Field of Classification Search
CPC ......... H01G 4/30; H01G 4/1227; H01G 4/224
See application file for complete search history.

(56) References Cited

U.S. PATENT DOCUMENTS

2008/0304204 A1    12/2008  Suzuki
2013/0208399 A1     8/2013  Morita et al.
(Continued)

FOREIGN PATENT DOCUMENTS

JP    2010-103566 A    5/2010
JP    2016-015369 A    1/2016
(Continued)

OTHER PUBLICATIONS

Korean Office Action dated Nov. 14, 2019 issued in Korean Patent Application No. 10-2018-0087283 (with English translation).

Primary Examiner — Eric W Thomas
(74) Attorney, Agent, or Firm — Morgan, Lewis & Bockius LLP (57) ABSTRACT A multilayer ceramic capacitor includes: a ceramic body including a dielectric layer, a first internal electrode and a second internal electrode arranged to face each other with the dielectric layer interposed therebetween; and a first external electrode disposed on an exterior surface of the ceramic body and a second external electrode disposed on the exterior surface of the ceramic body, wherein the ceramic body includes an active portion, forming capacity, cover portions disposed on upper and lower portions of the active portion, and margin portions disposed on a side surface of the active portion, and wherein the dielectric layer, the cover portions, and the margin portions of the active portion include magnesium (Mg) having content of more than 0 mole, and less than or equal to 1.0 mole, relative to titanium (Ti) included in the dielectric layer, the cover portions and the margin portions of the active portion.

9 Claims, 3 Drawing Sheets (51) Int. Cl.
*H01G 4/30* (2006.01)
*H01G 4/232* (2006.01)

(56) References Cited

U.S. PATENT DOCUMENTS

| | | |
|---|---|---|
| 2015/0340156 A1 | 11/2015 | Masunari et al. |
| 2015/0364259 A1* | 12/2015 | Kanzaki .................. H01G 4/30 |
| | | 361/301.4 |
| 2016/0196918 A1 | 7/2016 | Hong et al. |
| 2016/0284473 A1* | 9/2016 | Murosawa ............... H01G 4/30 |
| 2018/0261390 A1* | 9/2018 | Sakate ..................... H01G 4/30 |

FOREIGN PATENT DOCUMENTS

| | | |
|---|---|---|
| KR | 10-2014-0032293 A | 3/2014 |
| KR | 10-2015-0135092 A | 12/2015 |
| KR | 10-2016-0084614 A | 7/2016 |
| WO | 2012/023334 A1 | 2/2012 |

* cited by examiner

MULTILAYER CERAMIC CAPACITOR

CROSS-REFERENCE TO RELATED APPLICATION(S)

This application is a continuation patent application of U.S. patent application Ser. No. 16/156,694, filed on Oct. 10, 2018, which claims the benefit of priority to Korean Patent Application No. 10-2018-0087283 filed on Jul. 26, 2018, the disclosures of which are incorporated herein by reference in their entireties.

TECHNICAL FIELD

The present disclosure relates to a multilayer ceramic capacitor having improved product reliability.

BACKGROUND

In general, electronic parts using a ceramic material such as a capacitor, an inductor, a piezoelectric element, a varistor or a thermistor include a ceramic body formed of a ceramic material, an internal electrode disposed inside the body, and an external electrode provided on the surface of the ceramic body to be connected to the internal electrode.

Recently, owing to the miniaturization and multifunctionalization of electronic products, since there is also the tendency for miniaturization and high functionality in chip parts, a multilayer ceramic capacitor is also required to have a small sized and high capacity.

In particular, since a capacitance value in actual use conditions may be important, the DC-bias characteristics indicated as a capacitance value secured when the DC-bias is applied become an important consideration.

Also, since in the mobile phone market, the system is shifting from existing 4G to 5G networks, securing capacity under high frequency and low electric field conditions is becoming a major issue.

Proper grain growth control of dielectric grains in the ceramic body of the multilayer ceramic capacitor is essential for securing DC-bias characteristics and securing necessary capacitance under the high frequency and low electric field conditions as described above.

SUMMARY

An aspect of the present disclosure may provide a multilayer ceramic capacitor having improved product reliability.

According to an aspect of the present disclosure, a multilayer ceramic capacitor may include a ceramic body including a dielectric layer, a first internal electrode and a second internal electrode arranged to face each other with the dielectric layer interposed therebetween, a first surface and a second surface opposing each other, a third surface and a fourth surface connecting the first surface and the second surface respectively and opposing each other, and a fifth surface and a sixth surface connecting the first surface through the fourth surface and opposing each other; and a first external electrode disposed on an exterior surface of the ceramic body and electrically connected to the first internal electrode and a second external electrode disposed on the exterior surface of the ceramic body and electrically connected to the second internal electrode, wherein the ceramic body includes an active portion, forming capacity, including the first internal electrode and the second internal electrode disposed to face each other with the dielectric layer interposed therebetween, and further includes cover portions disposed on upper and lower portions of the active portion and margin portions disposed on side surfaces of the active portion, and wherein the dielectric layer, the cover portions, and the margin portions of the active portion each include magnesium (Mg) having a content of more than 0 mole, and less than or equal to 1.0 mole, relative to a content of titanium (Ti) included in the dielectric layer, the cover portions and the margin portions of the active portion, respectively.

According to another aspect of the present disclosure, a multilayer ceramic capacitor may include a ceramic body including a dielectric layer, a first internal electrode and a second internal electrode arranged to face each other with the dielectric layer interposed therebetween; and a first external electrode disposed on an exterior surface of the ceramic body and electrically connected to the first internal electrode and a second external electrode disposed on the exterior surface of the ceramic body and electrically connected to the second internal electrode, wherein the ceramic body includes an active portion, forming capacity, including the first internal electrode and the second internal electrode disposed to face each other with the dielectric layer interposed therebetween, and further includes margin portions disposed on side surfaces of the active portion and upper and lower surfaces of the active portion, the margin portions being outer portions of the ceramic body which exclude the active portion, and wherein the dielectric layer and the margin portions of the active portion each include magnesium (Mg) having a content of more than 0 mole, and less than or equal to 1.0 mole, with respect to a content of titanium (Ti) included in the dielectric layer and the margin portions of the active portion, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments in the present disclosure will now be described in detail with reference to the accompanying drawings.

Figure 1:
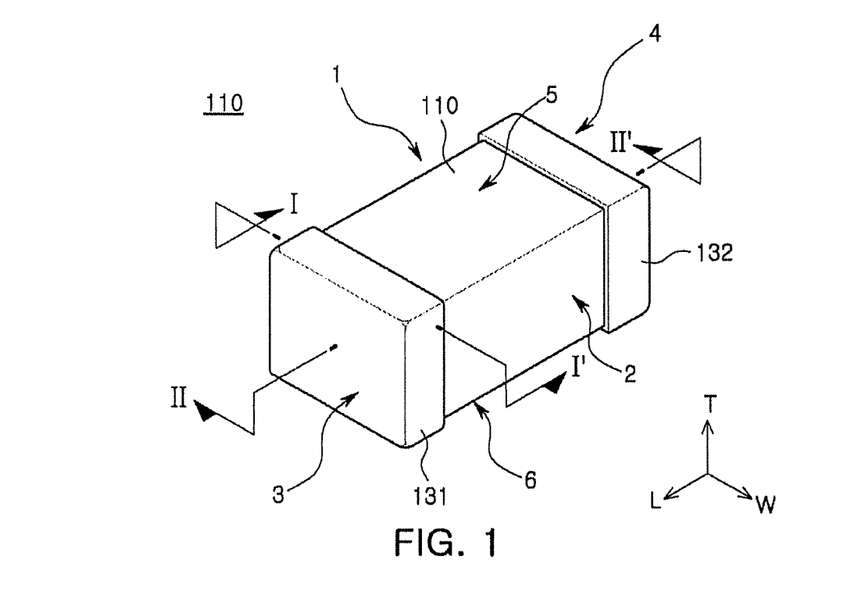
FIG. 1 is a schematic perspective view showing a multilayer ceramic capacitor according to an exemplary embodiment in the present disclosure.

FIG. 1 is a schematic perspective view showing a multilayer ceramic capacitor 100 according to an exemplary embodiment in the present disclosure.

Figure 2:
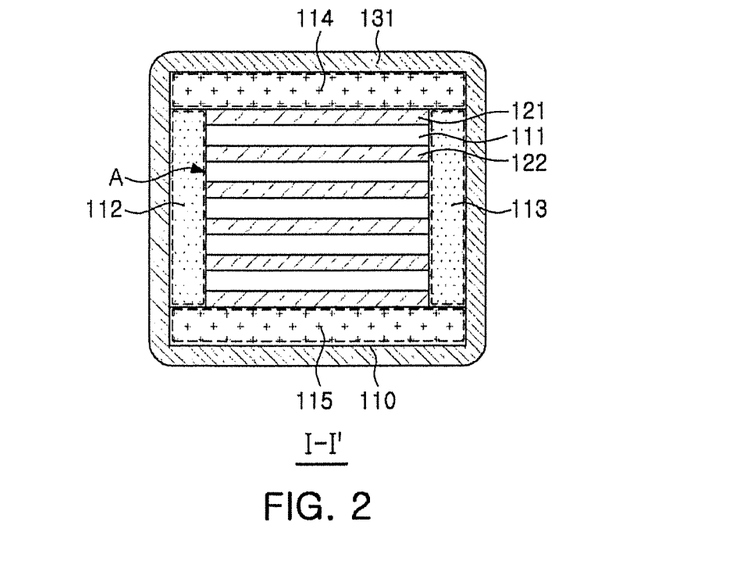
FIG. 2 is a cross-sectional view taken along line I-I' of FIG. 1.

FIG. 2 is a cross-sectional view taken along line I-I' of FIG. 1.

Figure 3:
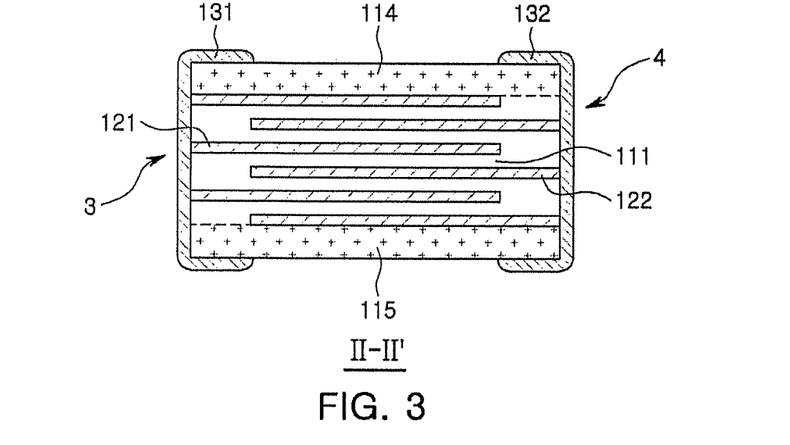
FIG. 3 is a cross-sectional view taken along line II-II' of FIG. 1.

FIG. 3 is a cross-sectional view taken along line II-II' of FIG. 1.

Referring to FIGS. 1 through 3, the multilayer ceramic capacitor 100 according to an exemplary embodiment in the present disclosure includes a ceramic body 110, a plurality of first and second internal electrodes 121 and 122 disposed inside the ceramic body 110, and first and second external electrodes 131 and 132 disposed on the external surface of the ceramic body 110.

The ceramic body 110 may have a first surface 1 and a second surface 2 opposing each other and a third surface 3 and a fourth surface 4 connecting the first surface 1 and the second surface 2 respectively, and a fifth surface 5 and a sixth surface 6 which are an upper surface and a lower surface respectively.

The first surface 1 and the second surface 2 may face each other in a width direction of the ceramic body 110. The third surface 3 and the fourth surface 4 may be defined as surfaces opposing each other in a longitudinal direction. The fifth surface 5 and the sixth surface 6 may be defined as surfaces opposing each other in a thickness direction.

The shape of the ceramic body 110 is not particularly limited, but may be a rectangular parallelepiped shape as shown.

The plurality of internal electrodes 121 and 122 disposed inside the ceramic body 110 have one ends exposed to the third surface 3 or the fourth surface 4 of the ceramic body 110.

The internal electrodes 121 and 122 may have a pair of the first internal electrode 121 and the second internal electrode 122 having different polarities.

One end of the first internal electrode 121 may be exposed to the third surface 3. One end of the second internal electrode 122 may be exposed to the fourth surface 4.

The other ends of the first internal electrode 121 and the second internal electrode 122 are formed at regular intervals from the third surface 3 or the fourth surface 4.

The first and second external electrodes 131 and 132 may be disposed on the third and fourth surfaces 3 and 4 of the ceramic body 110 and electrically connected to the first and second internal electrodes 121 and 122.

According to an exemplary embodiment in the present disclosure, a raw material forming a dielectric layer 111 is not particularly limited as long as sufficient electrostatic capacitance is obtainable therewith. For example, the raw material may be barium titanate ($BaTiO_3$) powder.

As the material forming the dielectric layer 111, various ceramic additives, organic solvents, plasticizers, binders, dispersants and the like may be added to powder such as barium titanate ($BaTiO_3$) according to the purpose of the present disclosure.

The dielectric layer 111 may be in a sintered state such that boundaries between adjacent dielectric layers may be integrated may not confirmed with the naked eye.

The length of the ceramic body 110 corresponds to a distance from the third surface 3 to the fourth surface 4 of the ceramic body 110.

The length of the dielectric layer 111 forms the distance between the third surface 3 and the fourth surface 4 of the ceramic body 110.

According to an exemplary embodiment in the present disclosure, the length of the ceramic body 110 may be 400 to 1400 μm but is not limited thereto. More specifically, the length of the ceramic body 110 may be 400 to 800 μm, or 600 to 1400 μm.

The internal electrodes 121 and 122 may be disposed on the dielectric layer 111 and may be formed inside the ceramic body 110 with a single dielectric layer interposed therebetween by sintering.

Referring to FIG. 3, the first internal electrode 121 is disposed on the dielectric layer 111. The first internal electrode 121 is not formed entirely with respect to the longitudinal direction of the dielectric layer 111. That one end of the first internal electrode 121 may be formed at a predetermined distance from the fourth surface 4 of the ceramic body 110, and the other end of the first internal electrode 121 may be formed up to the third surface 3 and exposed to the third surface 3.

The end of the first internal electrode 121 exposed to the third surface 3 of the ceramic body 110 is connected to the first external electrode 131.

To the contrary of the first internal electrode 121, one end of the second internal electrode 122 is formed at a predetermined distance from the third surface 3 and the other end of the second internal electrode 122 is exposed to the fourth surface 4 and is connected to the second external electrode 132.

The material of forming the first and second internal electrodes 121 and 122 is not particularly limited. For example, the first and second internal electrodes 121 and 122 may be formed by using a conductive paste including one or more materials selected from the group consisting of silver (Ag), lead (Pb), platinum (Pt), nickel (Ni), and copper (Cu).

The first and second external electrodes 131 and 132 may be electrically connected to the first and second internal electrodes 121 and 122 respectively to form capacitance. The second external electrode 132 may be connected to the first external electrode 131 at a different electric potential.

The multilayer ceramic capacitor 100 according to an exemplary embodiment in the present disclosure includes an active portion A disposed inside the ceramic body 110 and forming capacity including the first internal electrode 121 and the second internal electrode 122 arranged to face each other with the dielectric layer 111 interposed therebetween, cover portions 114 and 115 disposed on upper and lower portions of the active portion A respectively, and margin portions 112 and 113 provided on the side surfaces of the active portion A.

The active portion A is as a portion contributing to capacity formation of the capacitor 100 and may be formed by repeatedly stacking the plurality of first and second internal electrodes 121 and 122 with a dielectric layer 111 interposed therebetween.

The upper cover portion 114 and the lower cover portion 115 may have the same material and configuration as the dielectric layer 111 except that the upper cover portion 114 and the lower cover portion 115 do not include internal electrodes.

That is, the upper cover portion 114 and the lower cover portion 115 may include a ceramic material, for example, a barium titanate ($BaTiO_3$) based ceramic material.

The upper cover portion 114 and the lower cover portion 115 may be formed by stacking a single dielectric layer or two or more dielectric layers on the upper and lower surfaces of the active portion A in the vertical direction and may basically prevent damage of an internal electrode by physical or chemical stress.

The margin portions 112 and 113 include the margin portion 112 disposed on the first surface 1 of the ceramic body 110 and the margin portion 113 disposed on the second surface 2.

That is, the margin portions 112 and 113 may be disposed on both sides of the ceramic body 110 in the width direction.

As shown in FIG. 2, the margin portions 112 and 113 mean regions between both ends of the first and second internal electrodes 121 and 122 and an interface of the ceramic body 110 in a cross section of the ceramic body 110 cut in the width-thickness (WT) direction.

According to an exemplary embodiment in the present disclosure, the dielectric layer 111, the cover portions 114 and 115 and the margin portions 112 and 113 of the active portion A include magnesium (Mg). The magnesium (Mg) has content of more than 0 mole, and less than or equal to 1.0 mole, relative to titanium (Ti) included in each of the dielectric layer 111, the cover portions 114 and 115 and the margin portions 112 and 113 of the active portion A.

Recently, owing to the miniaturization and multi-functionalization of electronic products, since there is also the tendency of miniaturization and high functionality of chip parts, a multilayer ceramic capacitor is also required to have a small size and high capacity.

In particular, since a capacitance value in the actual use condition becomes important, the DC-bias characteristic indicated as a capacitance value secured when the DC-bias is applied becomes an important condition.

Also, since the system shifts from the existing 4G to 5G in a mobile phone market, securing capacity under high frequency and low electric field conditions is becoming a major issue.

Proper grain growth control of dielectric grains in the ceramic body of the multilayer ceramic capacitor is essential for securing the DC-bias characteristic and securing the necessary capacitance under the high frequency and low electric field conditions as described above.

According to an exemplary embodiment in the present disclosure, the dielectric layer 111, the cover portions 114 and 115, and the margin portions 112 and 113 of the active portion A in the ceramic body 110 may include magnesium (Mg) and in which the content of magnesium (Mg) is controlled, and thus the grain growth control of dielectric grains in each region may be controlled, thereby securing the DC-bias characteristic and securing the necessary capacitance under the high frequency and low electric field conditions.

That is, according to an exemplary embodiment in the present disclosure, for the effective grain growth control of dielectric grains of the dielectric layer 111, the cover portions 114 and 115, and the margin portions 112 and 113 of the active portion A in the ceramic body 110, all of the dielectric layer 111, the cover portions 114 and 115 and the margin portions 112 and 113 of the active portion A include magnesium (Mg).

In addition, in an exemplary embodiment in the present disclosure, the content of magnesium (Mg) included in the dielectric layer 111, the cover portions 114 and 115, and the margin portions 112 and 113 of the active portion A may be controlled, thereby securing the DC-bias characteristic and securing the necessary capacitance under the high frequency and low electric field conditions.

The dielectric layer 111, the cover portions 114 and 115 and the margin portions 112 and 113 of the active portion A may include a mother material main component including Ba and Ti.

The mother material main component includes a main component expressed as (Ba, Ca) (Ti, Ca) $O_3$, (Ba, Ca) (Ti, Zr) $O_3$, Ba (Ti, Zr) $O_3$, and (Ba, Ca) (Ti, Sn) $O_3$ which partially employ $BaTiO_3$ or Ca, Zr, Sn. The mother material main component may be included in the form of powder.

The dielectric layer 111, the cover portions 114 and 115 and the margin portions 112 and 113 of the active portion A may include a first subcomponent including at least one of Mn, V, Cr, Fe, Ni, Co, Cu, and Zn as a subcomponent.

Also, the dielectric layer 111, the cover portions 114 and 115 and the margin portions 112 and 113 of the active portion A may further include a second subcomponent including at least one of Ba and Ca, a third subcomponent including an oxide or carbonate containing Si, or a glass compound including Si, a fourth subcomponent including at least one of Y, Dy, Ho, Er, Gd, Ce, Nd, Sm, La, Tb, Yb and Pr, and a fifth subcomponent including Mg or Al.

The magnesium (Mg) included in the dielectric layer 111, the cover portions 114 and 115 and the margin portions 112 and 113 of the active portion A has content of more than 0 mole, and less than or equal to 1.0 mole, relative to titanium (Ti) included in each of the dielectric layer 111, the cover portions 114 and 115 and the margin portions 112 and 113 of the active portion A.

In general, magnesium (Mg) oxide is known to be added to barium titanate to control the grain growth of dielectric grains.

That is, it is known that when the content of magnesium (Mg) oxide added to barium titanate is large, the grain growth of dielectric grains is suppressed, and when the amount of addition is small, abnormal grain growth particles are generated.

However, the content of magnesium (Mg) that may effectively control grain growth of the dielectric grain is not particularly known.

According to an exemplary embodiment in the present disclosure, each region may include the content of magnesium (Mg) of more than 0 mole and less than or equal to 1.0 mole relative to titanium (Ti) as described above, thereby securing the DC-bias characteristic and securing the necessary capacitance under the high frequency and low electric field conditions.

When the content of magnesium (Mg) is 0 mole relative to titanium (Ti) in each region, the dielectric grains in each region are excessively grown, and DC-bias characteristics may not be ensured, and it is difficult to secure the necessary capacitance under the high frequency and low electric field conditions.

Meanwhile, when the content of magnesium (Mg) exceeds 1.0 mole relative to titanium (Ti) in each region, since the grain growth of the dielectric grains in each region may be excessively suppressed, it is difficult to secure the necessary capacitance.

In particular, the multilayer ceramic capacitor 100 according to an exemplary embodiment in the present disclosure is an ultra small and high capacity product. The thickness of the dielectric layer 111 is 0.4 µm or less and the thickness of the first and second internal electrodes 121 and 122 is 0.4 µm or less, but the present disclosure is not necessarily limited thereto.

Since the multilayer ceramic capacitor 100 according to an exemplary embodiment in the present disclosure is the an ultra small and high capacity product, the thickness of the dielectric layer 111 and the first and second inner electrodes 121 and 122 are relatively thin compared to the conventional product. In the case of a product to which such a thin film dielectric layer and a thin internal electrode are applied, the grain growth control of dielectric grains in each region of a dielectric layer, a cover portion, and a margin portion of an active portion is a very important issue for achieving the target capacitance and improving product reliability.

That is, since the dielectric layer and the internal electrode included in the conventional multilayer ceramic capacitor have a relatively greater thickness than the dielectric layer and the internal electrode included in the multilayer ceramic capacitor according to an exemplary embodiment in the present disclosure, adjusting the content of magnesium (Mg) for the grain growth control of dielectric grains in each region of a dielectric layer, a cover portion, and a margin portion of an active portion was not a major problem.

However, in a product to which the thin dielectric layer and internal electrode are applied as in an exemplary embodiment in the present disclosure, the content of magnesium (Mg) included in each region of a dielectric layer, a cover portion, and a margin portion of an active portion needs to be adjusted for the grain growth control of dielectric grains.

According to an exemplary embodiment in the present disclosure, since each region includes the content of magnesium (Mg) of more than 0 mole and less than or equal to 1.0 mole relative to titanium (Ti), even when the dielectric layer 111 and the first and second internal electrodes 121 and 122 are thin films having the thickness of 0.4 μm or less, the DC-bias characteristic may be secured, and the necessary capacitance under the high frequency and low electric field conditions may be secured.

However, the thin film does not mean that the thicknesses of the dielectric layer 111 and the first and second internal electrodes 121 and 122 are limited to 0.4 μm or less, but may be understood as having thicknesses thinner than those of the conventional product.

Figure 4:
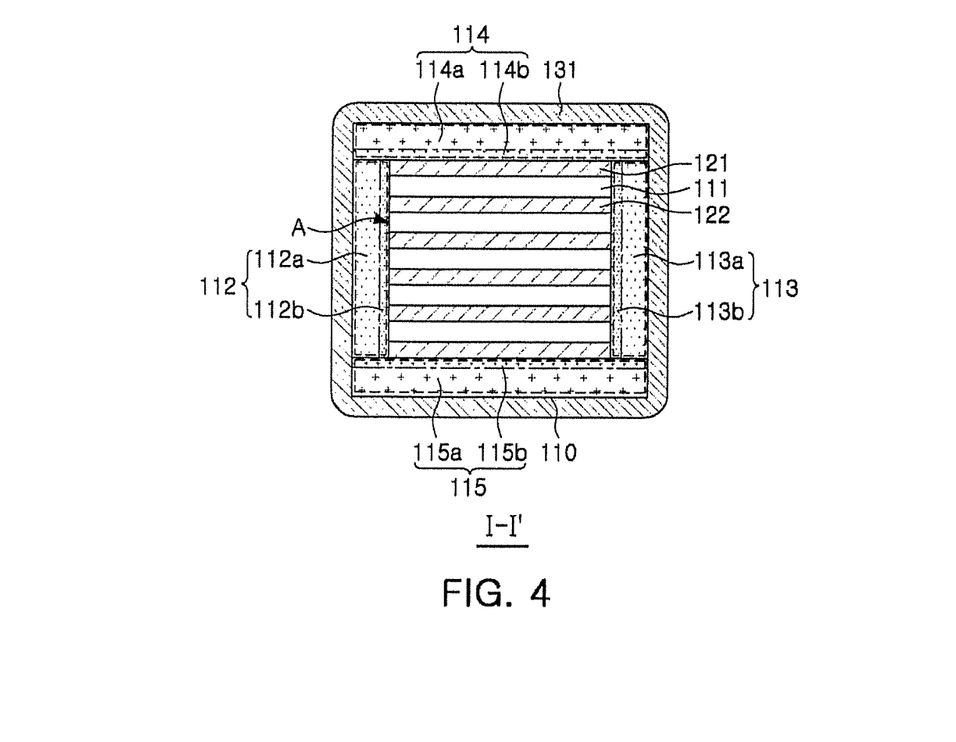
FIG. 4 is a cross-sectional view taken along line I-I' of FIG. 1 according to another exemplary embodiment in the present disclosure.

FIG. 4 is a cross-sectional view taken along line I-I' of FIG. 1 according to another exemplary embodiment in the present disclosure.

Figure 5:
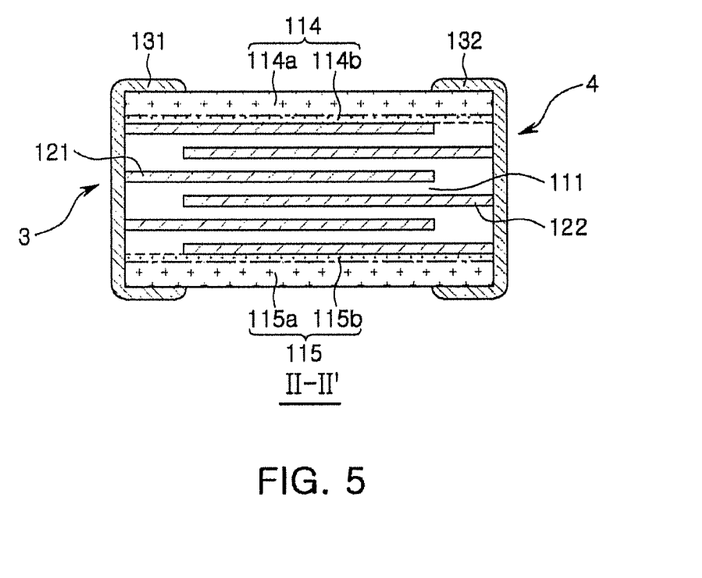
FIG. 5 is a cross-sectional view taken along line II-II' of FIG. 1 according to another exemplary embodiment in the present disclosure.

FIG. 5 is a cross-sectional view taken along line II-II' of FIG. 1 according to another exemplary embodiment in the present disclosure.

Referring to FIGS. 4 and 5, in a multilayer ceramic capacitor according to another exemplary embodiment in the present disclosure, the cover portions 114 and 115 are divided into first regions 114a and 115a adjacent to an outer surface of the ceramic body 110 and second regions 114b and 115b adjacent to the outermost one of the first and second internal electrodes 121 and 122. Content of magnesium (Mg) included in the first regions 114a and 115a and the second regions 114b and 115b may be different.

According to another exemplary embodiment in the present disclosure, the cover portions 114 and 115 in the ceramic body 110 are divided into two regions having different compositions, and the content of magnesium (Mg) included in each region is different, and thus the denseness of the cover portions 114 and 115 may be enhanced, thereby improving the moisture resistance characteristic.

The content of magnesium (Mg) included in the first regions 114a and 115a of the cover portions 114 and 115 may be greater than the content of magnesium (Mg) included in the second regions 114b and 115b.

The first regions 114a and 115a of the cover portions 114 and 115 are regions adjacent to the outer surface of the ceramic body 110, and the content of magnesium (Mg) included in the first regions 114a and 115a may be adjusted to be greater than the content of magnesium (Mg) included in the second regions 114b and 115b of inside, and thus the denseness of the first regions 114a and 115a of the cover portions 114 and 115 may be enhanced, thereby improving the moisture resistance characteristic.

Meanwhile, the content of magnesium (Mg) included in the second regions 114b and 115b of the cover portions 114 and 115 may be greater than the content of magnesium (Mg) included in the first regions 114a and 115a.

The content of magnesium (Mg) included in the second regions 114b and 115b of the cover portions 114 and 115 may be adjusted to be greater than the content of magnesium (Mg) included in the first regions 114a and 115a of outside, and thus the denseness of the second regions 114b and 115b of the cover portions 114 and 115 may be enhanced, thereby improving the moisture resistance characteristic.

In particular, the content of magnesium (Mg) included in the first regions 114a and 115a of the cover portions 114 and 115 adjacent to the outer surface of the ceramic body 110 may be reduced, and thus adhesion with the first external electrode 131 and the second external electrode 132 may be improved.

According to another exemplary embodiment in the present disclosure, the margin portions 112 and 113 are divided into first regions 112a and 113a adjacent to an outer surface of the ceramic body 110 and second regions 112b and 113b adjacent to the first and second internal electrodes 121 and 122, and the content of magnesium (Mg) included in the first regions 112a and 113a and the second regions 112b and 113b may be different.

The margin portions 112 and 113 inside the ceramic body 110 may be divided into two regions having different compositions and the content of magnesium (Mg) included in each region may be different, and thus the denseness of the margin portions 112 and 113 may be enhanced, thereby improving the moisture resistance characteristic.

The content of magnesium (Mg) included the first regions 112a and 113a of the margin portions 112 and 113 may be greater than the content of magnesium (Mg) included in the second regions 112b and 113b.

The first regions 112a and 113a of the margin portions 112 and 113 are regions adjacent to the outer surface of the ceramic body 110 and the content of magnesium (Mg) included in the first regions 112a and 113a may be adjusted to be greater than the content of magnesium (Mg) included in the second regions 112b and 113b of inside, and thus the denseness of the first regions 112a and 113a of the margin portions 112 and 113 may be enhanced, thereby improving the moisture resistance characteristic.

Meanwhile, the content of magnesium (Mg) included in the second regions 112b and 113b of the margin portions 112 and 113 may be greater than the content of magnesium (Mg) included in the first regions 112a and 113a.

The content of magnesium (Mg) included in the second regions 112b and 113b of the margin portions 112 and 113 may be adjusted to be greater than the content of magnesium (Mg) included in the outside first regions 112a and 113a of the margin portions 112 and 113, and thus the denseness of the second regions 112b and 113b of the margin portions 112 and 113 may be enhanced, thereby improving the moisture resistance characteristic.

In particular, the content of magnesium (Mg) included in the first regions 112a and 113a of the margin portions 112 and 113 adjacent to the outer surface of the ceramic body 110 may be reduced, and thus adhesion with the first external electrode 131 and the second external electrode 132 may be improved.

Hereinafter, a method of manufacturing multilayer ceramic electronic parts according to an exemplary embodiment in the present disclosure will be described, but the present disclosure is not limited thereto.

The method of manufacturing the multilayer ceramic electronic parts according to the exemplary embodiment in the present disclosure may firstly apply and dry a slurry formed of powder such as barium titanate ($BaTiO_3$) or the like onto a carrier film to prepare a plurality of ceramic green sheets, thereby forming a dielectric layer.

The ceramic green sheets may be manufactured by mixing ceramic powder, a binder, and a solvent to prepare the slurry as sheets having a thickness of several micrometers by using a doctor blade method.

The ceramic powder includes a mother material main component expressed as $(Ba,Ca)(Ti,Ca)O_3$, $(Ba,Ca)(Ti,Zr)O_3$, $Ba(Ti,Zr)O_3$, and $(Ba,Ca)(Ti,Sn)O_3$ which partially employ $BaTiO_3$ or Ca, Zr, Sn. The mother material main component may be included in the form of powder.

The ceramic powder may include magnesium (Mg) as a subcomponent. Content of magnesium (Mg) is more than 0 mole and less than or equal to 1.0 mole relative to titanium (Ti).

Next, an internal electrode conductive paste including nickel powder having an average nickel particle size of 0.1 to 0.2 μm and 40 to 50 parts by weight may be provided.

The internal electrode conductive paste is applied on the green sheets by using a screen printing method to form internal electrodes, and the green sheets having internal electrode patterns arranged thereon are stacked to form the ceramic body 110.

Next, external electrodes including a conductive metal and glass may be disposed on the outside of the ceramic body 110.

The conductive metal is not particularly limited, but may be at least one selected from the group consisting of, for example, copper (Cu), silver (Ag), nickel (Ni), and alloys thereof.

The glass is not particularly limited, and a material having the same composition as glass used for manufacturing an external electrode of a general multilayer ceramic capacitor may be used.

The external electrodes may be disposed on an external surface of the ceramic body 110 and electrically connected to the first and second internal electrodes, respectively.

A plating layer may further be formed on the external electrodes.

The plating layer is not particularly limited, but may include at least one selected from the group consisting of, for example, nickel (Ni), tin (Sn), and alloys thereof.

As set forth above, according to the exemplary embodiment in the present disclosure, a dielectric layer, cover portions, and margin portions of an active portion in a ceramic body may include magnesium (Mg), and content of magnesium (Mg) may be adjusted, and thus grain growth control of dielectric grains may be controlled, thereby securing DC-bias characteristics, and securing the necessary capacitance under high frequency and low electric field conditions.

While exemplary embodiments have been shown and described above, it will be apparent to those skilled in the art that modifications and variations could be made without departing from the scope in the present disclosure as defined by the appended claims.

What is claimed is:

1. A multilayer ceramic capacitor comprising:
a ceramic body including a dielectric layer, a first internal electrode and a second internal electrode arranged to face each other with the dielectric layer interposed therebetween, a first surface and a second surface opposing each other, a third surface and a fourth surface connecting the first surface and the second surface respectively and opposing each other, and a fifth surface and a sixth surface connecting the first surface through fourth surface and opposing each other; and
a first external electrode disposed on an exterior surface of the ceramic body and electrically connected to the first internal electrode and a second external electrode disposed on the exterior surface of the ceramic body and electrically connected to the second internal electrode,
wherein the ceramic body includes an active portion, forming capacity, including the first internal electrode and the second internal electrode disposed to face each other with the dielectric layer interposed therebetween in a stacking direction, and further includes cover portions disposed on upper and lower portions of the active portion in the stacking direction and margin portions disposed on side surfaces of the active portion,
wherein the dielectric layer, the cover portions, and the margin portions of the active portion each include magnesium (Mg) having a content of more than 0 mole, and less than or equal to 1.0 mole, relative to 100 moles of titanium (Ti) included in the dielectric layer, the cover portions and the margin portions of the active portion, respectively,
wherein each of the cover portions includes a first region adjacent to an outer surface of the ceramic body and a second region adjacent to an outermost one of the first and second internal electrodes, and
wherein a content of magnesium (Mg) included in the second region is greater than a content of magnesium (Mg) included in the first region.

2. The multilayer ceramic capacitor of claim 1, wherein a thickness of the dielectric layer is 0.4 μm or less and a thickness of the first internal electrode and the second internal electrode is 0.4 μm or less.

3. The multilayer ceramic capacitor of claim 1, wherein each of the margin portions is divided into a first region adjacent to an outer surface of the ceramic body and a second region adjacent to the first and second internal electrodes, and contents of magnesium (Mg) included in the first region and the second region of the margin portions differ from each other.

4. The multilayer ceramic capacitor of claim 3, wherein the content of magnesium (Mg) included in the first region of the margin portions is greater than the content of magnesium (Mg) included in the second region.

5. The multilayer ceramic capacitor of claim 3, wherein the content of magnesium (Mg) included in the second region of the margin portions is greater than the content of magnesium (Mg) included in the first region.

6. A multilayer ceramic capacitor comprising:
a ceramic body including a dielectric layer, a first internal electrode and a second internal electrode arranged to face each other with the dielectric layer interposed therebetween in a stacking direction; and
a first external electrode disposed on an exterior surface of the ceramic body and electrically connected to the first internal electrode and a second external electrode disposed on the exterior surface of the ceramic body and electrically connected to the second internal electrode,
wherein the ceramic body includes:
an active portion, forming capacity, including the first internal electrode and the second internal electrode disposed to face each other with the dielectric layer interposed therebetween in a stacking direction; and
margin portions including a first portion disposed on side surfaces of the active portion and a second portion disposed on upper and lower surfaces of the active portion in the stacking direction, the margin portions being outer portions of the ceramic body which exclude the active portion,
wherein the dielectric layer and the margin portions of the active portion each include magnesium (Mg) having a content of more than 0 mole, and less than or equal to 1.0 mole, with respect to 100 moles of titanium (Ti) included in the dielectric layer and the margin portions of the active portion, respectively, and wherein, in the stacking direction, a content of magnesium (Mg) of an inner part of the margin portions adjacent to an outermost one of the first and second internal electrodes is greater than a content of magnesium (Mg) of an outer part of the margin portions adjacent to an outer surface of the ceramic body.

7. The multilayer ceramic capacitor of claim 6, wherein a thickness of the dielectric layer is 0.4 μm or less and a thickness of the first internal electrode and the second internal electrode is 0.4 μm or less.

8. The multilayer ceramic capacitor of claim 6, wherein each of the margin portions is divided into a first region adjacent to an outer surface of the ceramic body and a second region adjacent to the first and second internal electrodes, and contents of magnesium (Mg) included in the first region and the second region of the margin portions differ from each other.

9. The multilayer ceramic capacitor of claim 8, wherein the content of magnesium (Mg) included in the second region of the margin portions is greater than the content of magnesium (Mg) included in the first region.

\* \* \* \* \*